United States Patent [19]
Blacket et al.

[11] Patent Number: 5,779,127
[45] Date of Patent: Jul. 14, 1998

[54] FASTENING MACHINES

[75] Inventors: Stuart Edmund Blacket, Closeburn; Wojciech Gostylla, Camira, both of Australia

[73] Assignee: Henrob Ltd., Clwyd, United Kingdom

[21] Appl. No.: 722,020

[22] PCT Filed: Apr. 18, 1995

[86] PCT No.: PCT/AU95/00219

§ 371 Date: Oct. 11, 1996

§ 102(e) Date: Oct. 11, 1996

[87] PCT Pub. No.: WO95/28242

PCT Pub. Date: Oct. 26, 1995

[30] Foreign Application Priority Data

Apr. 18, 1994 [AU] Australia ............... PM5070

[51] Int. Cl.$^6$ ............... B21J 15/30; B25B 23/08
[52] U.S. Cl. ............... 227/107; 227/112; 227/113; 227/119; 227/149
[58] Field of Search ............... 227/107, 108, 227/112, 113, 119, 149

[56] References Cited

U.S. PATENT DOCUMENTS

| | | | |
|---|---|---|---|
| 2,013,826 | 9/1935 | Jacobson | 81/448 |
| 2,531,515 | 11/1950 | Johnson | 81/448 |
| 3,250,451 | 5/1966 | Fulop | 227/149 |
| 4,239,143 | 12/1980 | Johnson | 227/149 |
| 4,410,103 | 10/1983 | Fuhrmeister | 227/107 |
| 4,609,134 | 9/1986 | Daven | 227/112 |
| 4,978,046 | 12/1990 | Hagmann et al. | 227/119 |
| 4,995,543 | 2/1991 | Earl | 227/113 |
| 5,199,625 | 4/1993 | Dewey et al. | 227/113 |
| 5,480,087 | 1/1996 | Young et al. | 227/112 |

FOREIGN PATENT DOCUMENTS

| | | |
|---|---|---|
| 89616/91 | 6/1992 | Australia . |
| 214 328 | 10/1984 | Germany . |
| 1 313 913 | 4/1973 | United Kingdom . |
| 2 036 623 | 7/1980 | United Kingdom . |
| 2 079 717 | 7/1980 | United Kingdom . |
| 94/15736 | 7/1994 | WIPO . |

Primary Examiner—Scott A. Smith
Attorney, Agent, or Firm—Foley & Lardner

[57] ABSTRACT

A fastening machine (1) has guide block (11) with a rivet delivery passage (12). Rivets (17) are supplied from a source via tube (22) and are delivered to the rivet delivery passage (12) by a rivet supply passage (20). The head of the rivet (17) is engaged by spring-loaded balls (60) to hold the rivet (17) in alignment with the rivet delivery passage (12) and a punch (16). When a limit switch (30) detects the presence of a rivet (17) in the rivet delivery passage (12), the punch (16) is advanced and the rivet (17) is releasably supported by the balls (60) and secondary balls (60A) as it is advanced to work pieces to be secured together.

17 Claims, 10 Drawing Sheets

FASTENING MACHINES

BACKGROUND OF THE INVENTION

1. Field of the Invention

THIS INVENTION relates to improved fastening machines. In particular, this invention relates to improved punch/setting tool combinations for fastening machines.

2. Prior Art

U.S. Pat. No. 4,615,475 (Fuhrmeister) (=AU-B-28506/84 (566811)=International Publication No. WO 84/04710) discloses a feeder for headed fasteners, where the fasteners, mounted in tape, are sequentially advanced into alignment with the punch and die assembly of a fastening machine by an oscillating actuator, which is timed by the plunger holding the punch, the actuator releasably engaging the stems of the fasteners to advance the fasteners.

The feeder, and the fastening machine, has proved commercially successful in a wide range of industries. There are certain applications, however, eg. in the automotive and white goods industries, where the dimensions of the feeding head preclude the use of the above described type of fastening machine to fasten components together, where limited space is available.

In addition, the minimum radius of curvature of the tape entering and leaving the feeder head also limits the reduction of size of the feeder hereinbefore described to suit such applications.

In our International Application No. PCT/AU94/00013 (International Publication No. WO 94/15730), we disclose improved setting tools for the delivery of fasteners to a workpiece, where the fasteners are centered and stabilized by, eg. pins, balls, fingers, or resilient annular discs in the fastener delivery passage. The setting tools are particularly suitable for fasteners where the stem (or shank) length is less than, or equal to, the diameter of the head.

In certain applications, limited access to the workpieces being fastened precludes the use of the setting tools disclosed in the above International Application.

SUMMARY OF THE INVENTION

It is an object of the present invention to provide an improved fastening machine which has better nose access.

It is a preferred object to provide a fastening machine where the centralizing elements of the fastening machine can be raised to a position unrelated to fastener length.

It is a further preferred object to provide a vacuum to the fastener actuator to releasably retain the fastener thereto as the fastener is delivered to the workpiece.

It is a still further preferred object to provide a machine where the fastener is centralized on the fastener actuator as it is advanced in the fastener delivery passage.

It is a still further preferred object to provide a machine where the fasteners are fed to the setting tool by tape, blow feed, manually or the like.

The term "fastener" shall include rivets, screws and other like fastening devices.

The term "fastener actuator" includes a punch when the fastener is a rivet; a driver when the fastener is a screw; or other tooling appropriate to insert or apply the fastener after its delivery by the nose assembly.

The term "stem" of a fastener shall be hereinafter used to also include a "shank" of a fastener.

The term "fastener support means" includes means which guide or orient an advancing fastener as occurs, eg. in tape feed machines, where initial support may be by the tape, and the term includes means which engage either or both of the head and stem of an advancing fastener.

In one aspect, the present invention resides in a fastener actuator for a fastening machine wherein:

releasable fastener retaining means on a fastener engaging nose of the actuator releasably secures a fastener to the nose as the fastener is advanced towards a workpiece.

In a second aspect, the present invention resides in a setter tool and fastener actuator assembly for a fastening machine including:

a setter tool having a nose piece with a fastener delivery passage therein and a fastener supply passage to enable fasteners to be transferred from a fastener supply to the fastener delivery passage;

a fastener actuator slidably mounted for movement through the fastener delivery passage to move a fastener therefrom to a workpiece to be fastened thereby;

means operable to advance the fastener actuator through the fastener delivery passage, and releasable fastener retaining provided on a fastener engaging nose on the fastener actuator to releasably secure a fastener to the nose as the actuator moves through the fastener delivery passage and is advanced towards the workpiece.

The releasable fastener retaining means may include a vacuum; a magnet (permanent or switched electromagnet); contact adhesive or other suitable means.

In third and fourth aspects, the present invention resides in a fastening machine incorporating the fastener actuator of the first embodiment, or the assembly of the second embodiment, respectively.

Where the releasable fastener retaining means is a vacuum, preferably at least one passage is provided through the actuator, open at one end to the fastener engaging nose, and connected at its other end to a source of vacuum via a control valve. The source of vacuum may be connected to a chamber which surrounds a portion of the actuator, and port means in the actuator are selectively connected to the vacuum chamber as the actuator is advanced to provide the control valve means.

The fastener may be centralized relative to the fastener delivery passage and the actuator by balls, pins, fingers, rings or the like in the passage, or be received in a recess in the nose of the actuator, or have a protrusion or protrusions on the fastener head to engage a complementary recess or recesses on the nose.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
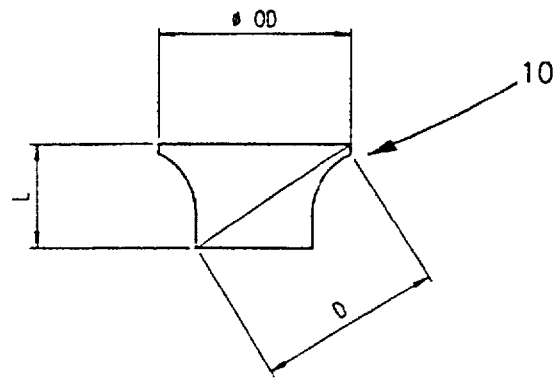
FIGS. 1 and 2 show the relative dimensions of a rivet and a passage therefor.
Figure 2:
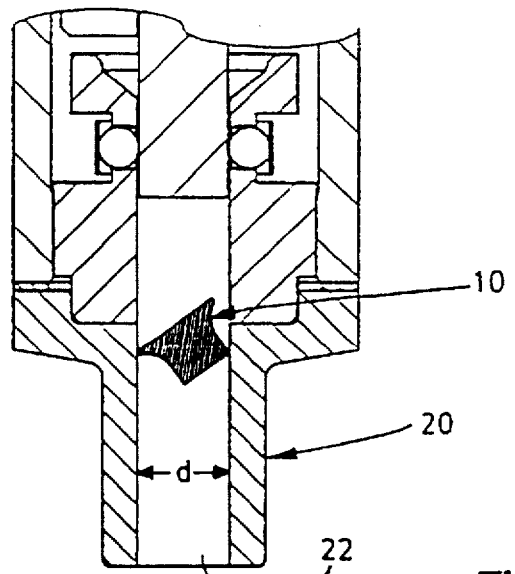

As shown in FIGS. 1 and 2, a rivet 10 (FIG. 1) with a diagonal dimension D (eg. 8.1 mm) will not tumble when passed through a tube or body 20 with a bore or passage 22 of small dimension d (ie. 8.00 mm) (FIG. 2). The problem of rivets 10 tumbling (and jamming) in a passage 22 is more likely to occur when the head diameter O D is greater than the stem length L (FIG. 1).

Figure 3:
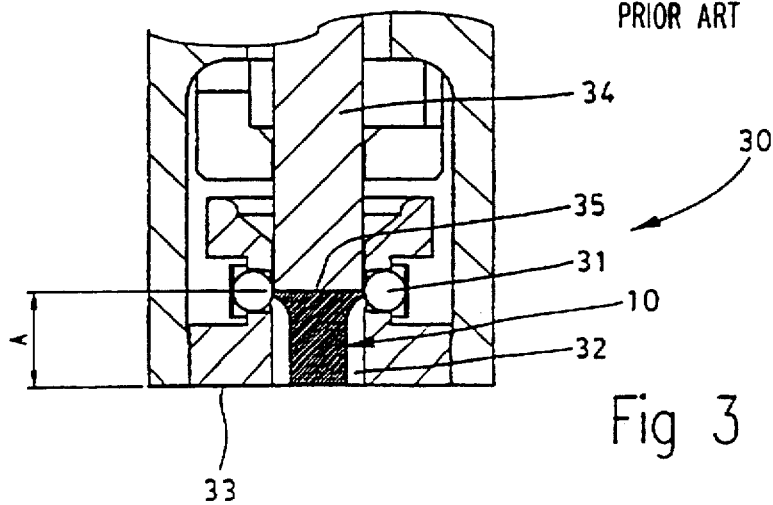
FIG. 3 is a sectional side view of a conventional fastening machine (not forming part of the present invention)

FIG. 3 shows a conventional (ie. prior art) fastening machine 30 where the distance A between the centralizing balls 31 in the delivery passage 32 are spaced a distance A from the end 33 of the fastening machine, dependent on the length L of the rivet 10. The punch 34 has a plain rivet engaging nose 35. The centralizing balls 31 must be no greater than a distance A from the end 33 to align the rivets 10 with the punch 34.

Figure 4:
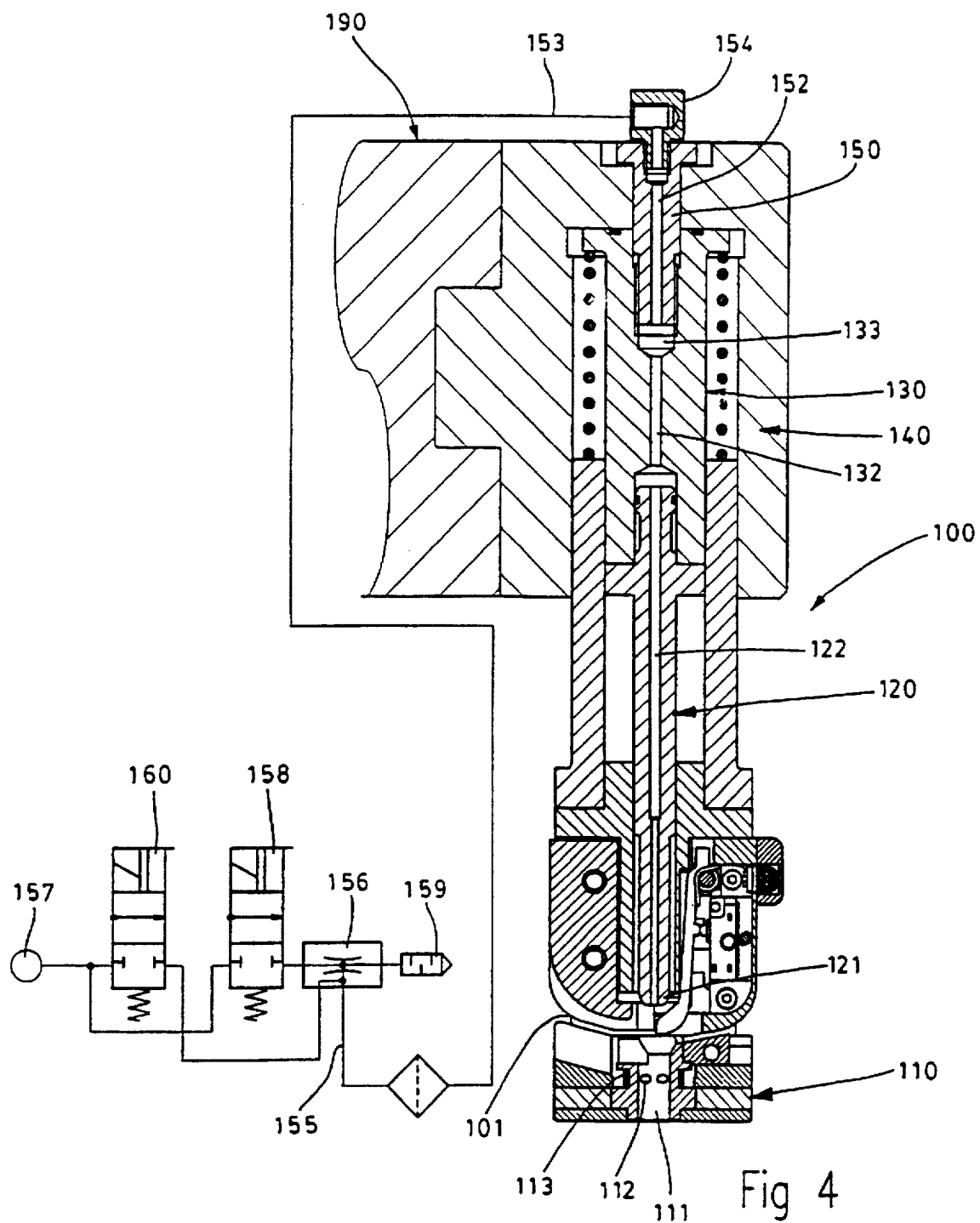
FIG. 4 is a sectional side view of a first embodiment of the invention.

Referring now to the first embodiment of FIG. 4, the riveting machine 100 has a setting tool 110 with a fastener delivery passage 111 therethrough, which receives rivets from a source (eg. tape) (not shown) via a delivery passage 101 transverse to the fastener delivery passage 111. A single layer of centralizing balls 112, backed by resilient springs 113, are provided adjacent the upper end of the fastener delivery passage 111 to centralize the rivets relative to the passage 111 and the nose 121 of the punch 120 mounted on the piston 130 in the cylinder housing or guide bush 140 of the riveting machine 100.

A vacuum passage 122 extends coaxially within the punch 120 and is connected to a vacuum passage 132 in the piston 130. The passage 132 is connected to a passage 152 through a vacuum fitting 150, fitted to the cylinder 140, and slidably sealed to a bore 133 in the upper end of the piston 130.

A vacuum line 153 connects the vacuum fitting 150, via elbow 154, to the vacuum port 155 of a venturi 156.

Compressed air from the air compressor 157 is directed by the electrically controlled vacuum valve 158 to the venturi 156 (and silencer 159) to generate a vacuum in the venturi 156. When the vacuum valve 158 is switched off, the double solenoid ejector valve 160 is opened to apply a positive pressure to vacuum port 155 to break the vacuum down more rapidly.

A rivet is supplied to the fastener delivery passage 111 (via the supply passage 101) and the punch 120 is advanced towards the workpiece not shown, supported on an upsetting die (not shown) aligned with the punch 120. (The cylinder 140 and upsetting die may be mounted on respective arms of a C-frame 190.)

As, or just before, the nose 121 of the punch 120 contacts the rivet head, the vacuum source is connected (by opening valve 158) to the vacuum passage 122 and so the rivet is drawn onto the punch nose 121. The balls 112 centralize the rivet on the nose 121 and the punch 120 advances the rivet through the fastener delivery passage 111 to the workpiece. When the rivet has been upset by the die, the vacuum source is disconnected from the vacuum passage 122 (by closing valve 158) and the punch 120 is retracted. (While the punch is being retracted, a brief blast of pressurised air may be blown through the vacuum passage (by opening valve 160) to clear any debris therefrom (and from the fastener delivery passage 111) and/or to selectively release the fastener from the punch). It will be noted that the rivet 10, held to the punch 120 by the vacuum, will not tumble or tilt as it is advanced to the workpiece, and the centralizing balls 112 of the setting tool 110 can be spaced a distance much greater than the distance A of the conventional fastening machine (30 FIG. 3) from the workpiece.

Figure 5:
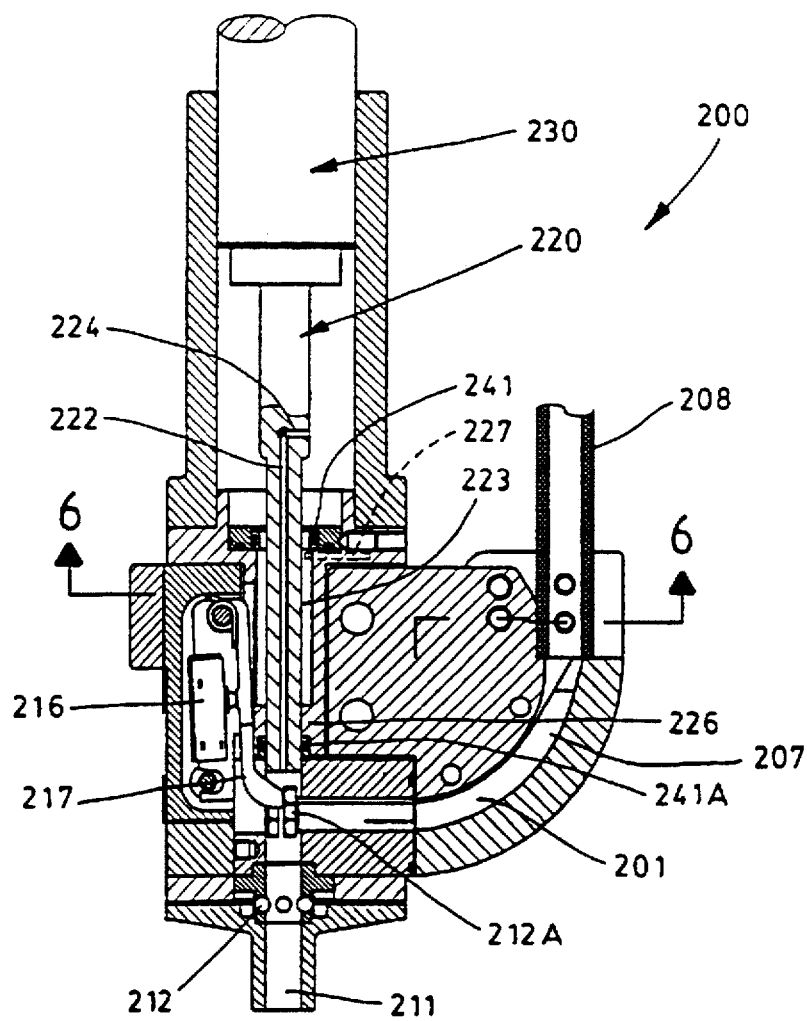
FIG. 5 is a sectional side view of a second embodiment.
Figure 6:
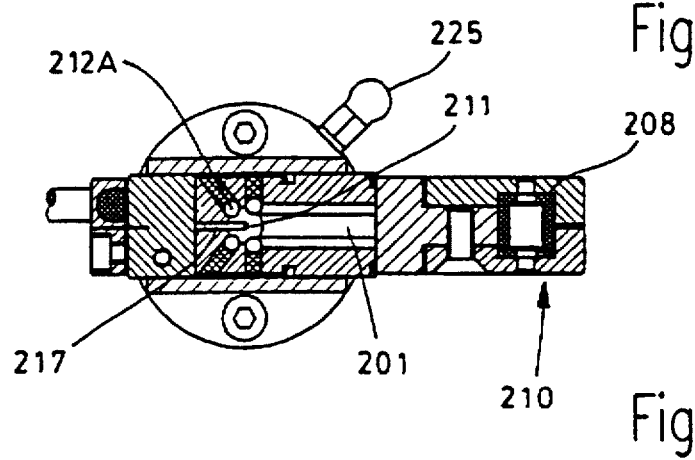
FIG. 6 is a bottom sectional view taken on line 6—6 on FIG. 5.

In the fastening machine 200 of FIGS. 5 and 6, a vacuum chamber 223 surrounds the punch 220 and is isolated from the cylinder or guide bush 140, containing the piston 230, by seals or at lapped spool 241 and 241A. Vacuum port 224 in the punch 220 selectively connects the vacuum passage 222 in the piston to the vacuum chamber 223 when the punch 220 has, or is just about to, engage the rivet head and so the punch 220 and chamber 223 co-operate to provide the timed control vacuum for the vacuum passage 222. The vacuum chamber 223 has an inlet 225 mounted on one side of the punch guide head 226, and is connected to the chamber by a port 227.

In this embodiment, the balls 212 are spaced a greater distance below the nose 221 of the punch 220 and so the balls 212 will centralize the rivet on the punch 220 after the rivet has been secured to the nose 221.

The fastener supply passage 201 receives the rivets, via a curved passage 207 in the setting tool 210 from a tube 208 connected to a remote blow feeder (not shown). Three sets of balls 212A engage and support the rivet in the fastener delivery passage 211 before the punch 220 is advanced. A micro switch 216 has a trigger 217 to detect the presence of a rivet in the delivery passage 211, the micro switch preventing advance of the punch 220 when no rivet is detected.

Figure 7:
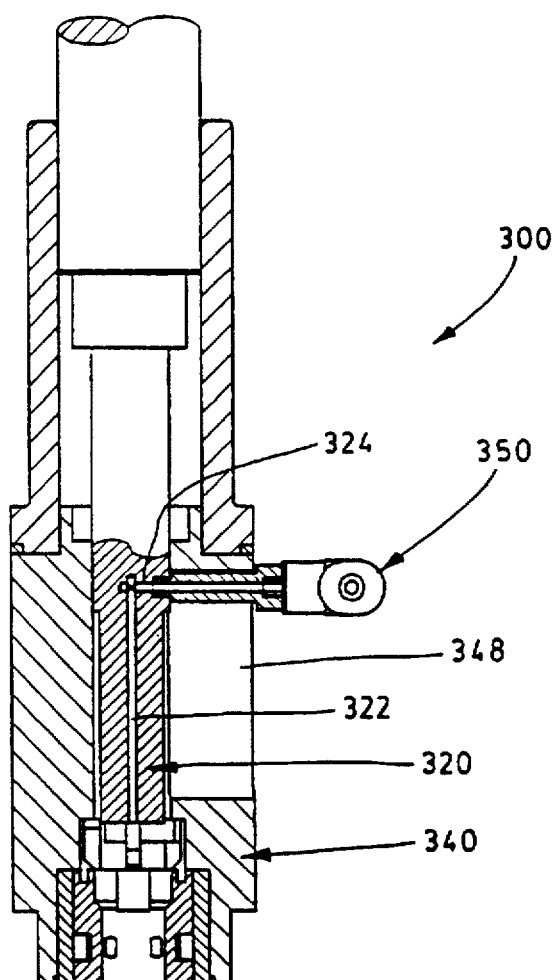
FIG. 7 is a sectional side view of a third embodiment.
Figure 8:
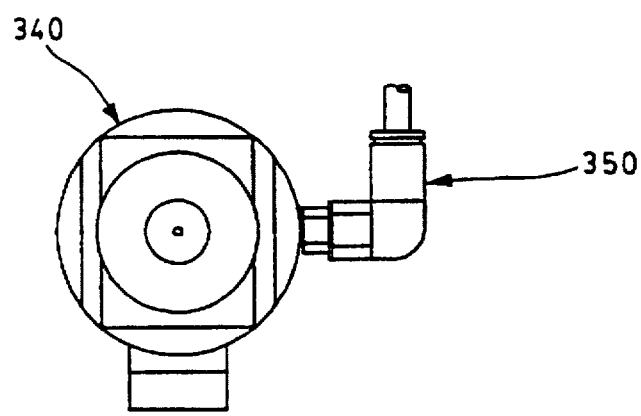
FIG. 8 is a bottom plan view of the third embodiment.

In the third embodiment of FIGS. 7 and 8, the fastening machine 300 has its vacuum fitting 350 mounted transversely on the piston 320 and is connected to the vacuum passage 322 by the vacuum port 324. An elongate slot 348 is provided in the cylinder or guide bush 340 to allow the vacuum fitting to advance and retract with the punch 320. The vacuum connection to the vacuum passage 322 is controlled as hereinbefore described with reference to FIG. 4.

Figure 9:
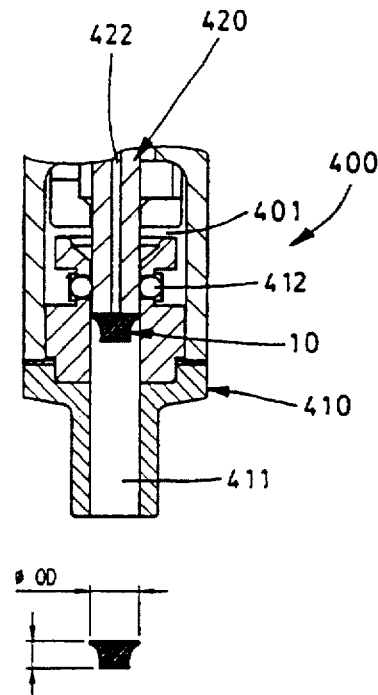
FIGS. 9 to 14 are sectional side views of respective fourth to ninth embodiments.

The fastening machine 400 of the fourth embodiment (see FIG. 9) allows a simple nose design for the setting tool 410 and is particularly suitable for rivets 10 where the head diameter OD is greater than the stem length L. Each rivet is supplied via a tape and pushed through the supply passage 401 to the fastener delivery passage 411 and immediately centralized by the balls 412 as the punch 420 is advanced to engage the rivet. The vacuum applied to the rivet head via vacuum passage 422 retains the rivet on the punch nose 421.

Figure 10:
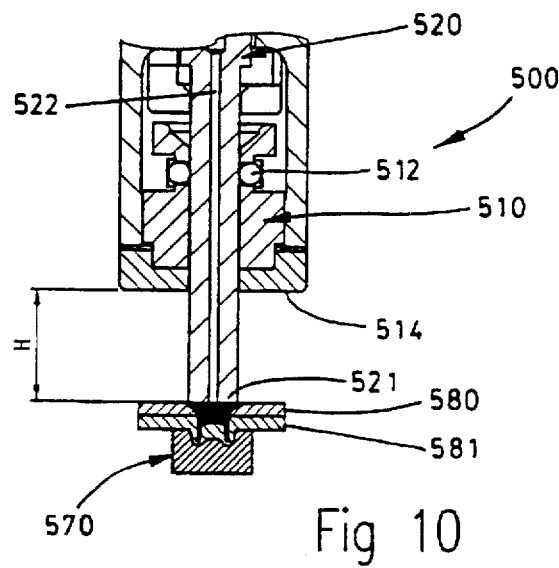

FIG. 10 shows a fastening machine 500 where the nose 514 of the setting tool 510 is spaced a distance H from the workpieces 580, 581 (and die 570) to prevent damage or marking of the upper surface of workpiece 580. The rivet 10 is carried and retained (via vacuum connected to vacuum passage 522) on the nose 521 of the punch 520 over the distance H, after having been centralized by the balls 512.

The fastening machine 600 (see FIG. 11) is similar to the fastening machine 500 of FIG. 10, and shows how the machine can be used where access to the workpieces 680, 681 and die 670 is difficult and/or delicate. Once again, the rivet 10 is releasably secured to the nose 621 of the punch 620 via the vacuum in the vacuum passage 622.

The fastening machine 700 (FIG. 12) shows the fixing of a deep channel workpieces 780 to a second workpiece 781 where access for the nose 714 of the setting tool 710 is impossible. The nose 714 may have a resilient block or pad 715 to preclamp and/or protect the workpiece 780, 781 before the rivet 10, secured on the nose 721 of the punch 720 via vacuum connected to vacuum passage 722, is advanced by the punch 720 and upset by the die 770.

Figure 13:
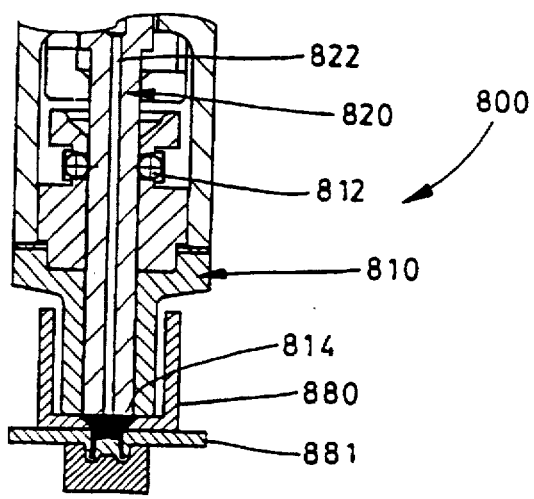

The fastening machine 800 of FIG. 13 enables preclamping of the deep channel workpiece 880 to the workpiece 881 by the nose 814 of the upsetting tool 810 where access is limited. A small cross-sectional area of the nose 814 or, alternatively, high loads can be applied to the nose 814 (without affecting the stress levels which would normally be limited by the provision of the centralizing balls 812 near to the bottom of the setting tool 810). Both pre-clamping and post-clamping of the workpieces 880, 881 can be affected, while the rivet is secured to the punch 820 by vacuum applied to vacuum passage 822 as hereinbefore described.

Figure 11:
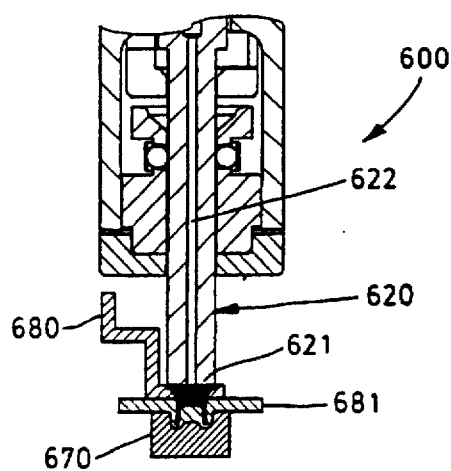
Figure 12:
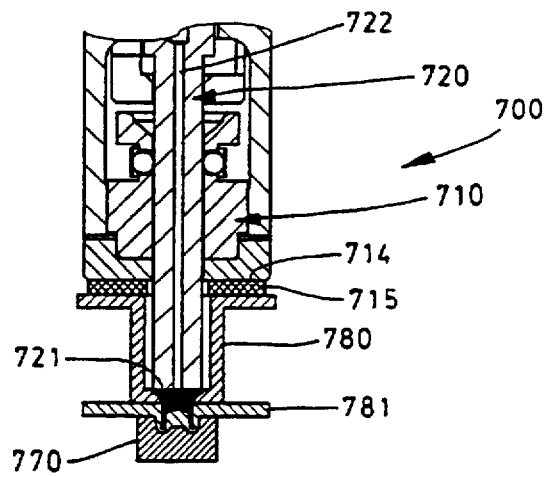
Figures 14, 15:
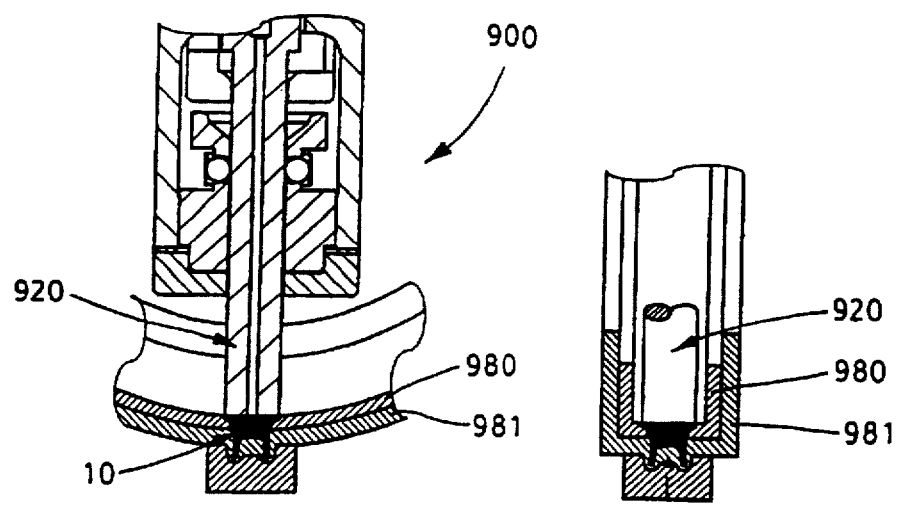
FIG. 15 is a sectional end view of the embodiment of FIG. 14.

FIGS. 14 and 15 show a fastening machine 900, similar to the fastening machines 600 and 700 of FIGS. 11 and 12, where the punch 920 advances the rivet 10 into a channel section workpiece 980, to be fixed to a second workpiece 981. As the workpieces 980, 981 are curved in side view, the distance that the punch 920 must advance the rivet is increased.

Figure 16:
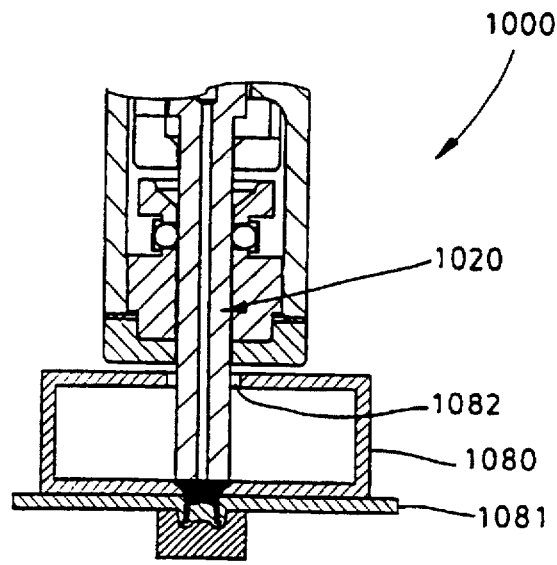
FIGS. 16 to 19 are sectional side views of tenth to thirteenth embodiments of the invention.

FIG. 16 shows how a machine 1000, similar to the fastening machines 600, 700 of FIGS. 11 and 12 can fix a box section workpiece 1080 to a workpiece 1081 where the punch 1020 advances the rivet through an access hole 1082.

Figure 17:
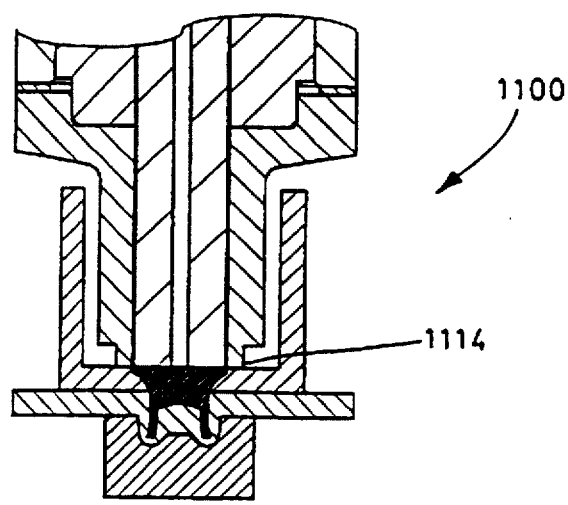

The fastening machine 1100 of FIG. 17 is generally similar to the machine 800 of FIG. 13, except that the nose 1114 is relieved at its forward end.

In all of the embodiments of FIGS. 4 to 17, the rivets have been centralised relative to the punches by balls or the like in the fastener delivery passages.

Figure 18:
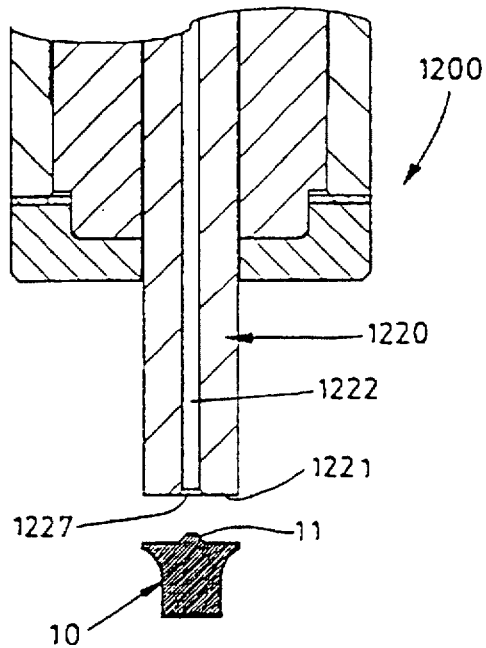
Figure 19:
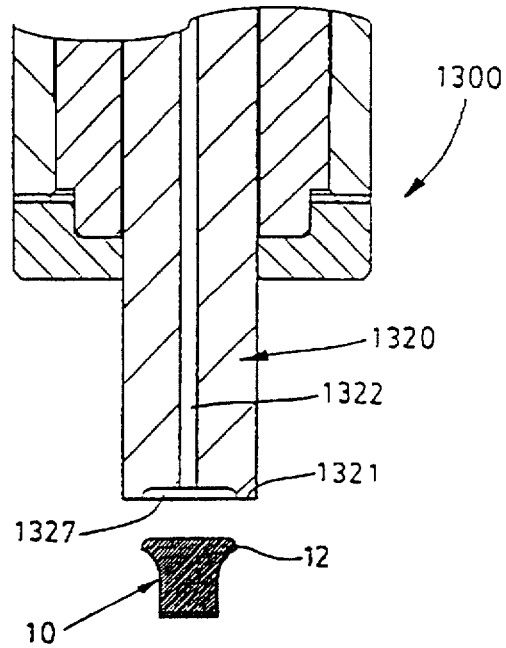

In FIG. 18, a conical protrusion 11 on the rivet 10 engages a conical socket 1227 in the vacuum passage 1222 at the nose 1221 of the punch 1220 (of fastening machine 1200) to centralize the rivet 10 to the punch 1220, while in FIG. 14, the head 12 of a rivet 10 is received in a complementary socket or recess 1327 in the nose 1321 of the punch 1320, the socket 1327 being connected to the vacuum passage 1322 of fastening machine 1300.

Figure 20:
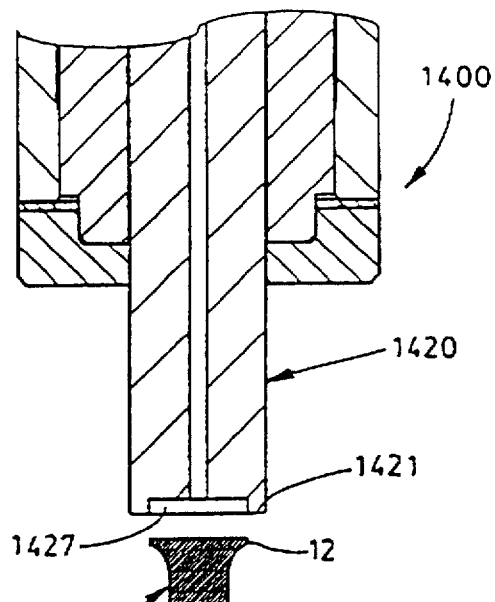
FIGS. 20 and 21 are sectional side views of a fourteenth embodiment.

The machine 1400 (see FIGS. 20 and 21) has a recess 1427 in the nose 1421 of punch 1420, the recess 1427 being dimensioned to receive the head 12 of the rivet 10.

Figure 21:
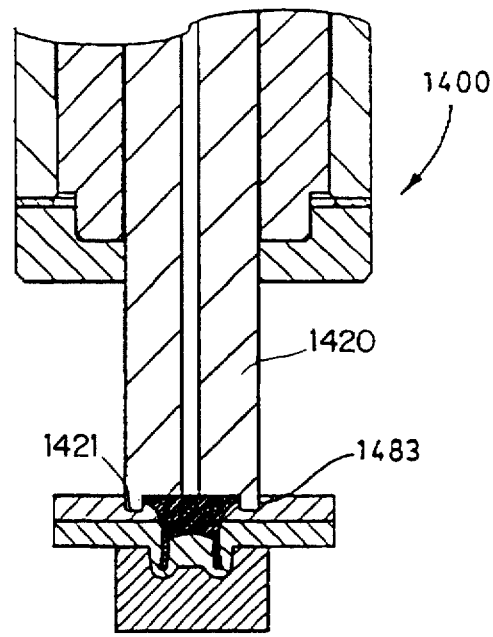

As shown in FIG. 21, the nose 1421 of the punch 1420, in the configuration of a peripheral flange, forms an annular recess in the upper workpiece 1483, ie. it "coins" the parent workpiece material about the rivet head 12, after the rivet 10 has been set, to improve the fatigue strength of the joint and/or the aesthetic appearance thereof.

The "coining" of the workpieces is particularly important in the manufacture to include panels from aluminium sheets.

The machine 1100 of FIG. 17 can achieve the same objective, except that the "coining" is independent of the punch and can be effected, pre- or post-insertion of the rivet in the workpieces.

The recesses 1227, 1327, 1427 in the punches 1220, 1320, 1420, to centralise the rivets 10, may be employed in applications where the space adjacent the workpiece is so tight that centralizing elements, such as the balls, cannot be provided in the setter tools. They may also be used where a large diameter punch must be used to "coin" the material of the workpiece(s) around the joint, and centralizing elements for the rivet would be ineffective (ie. too far away from the rivets or opened by the punch, not the rivets).

Figure 22:
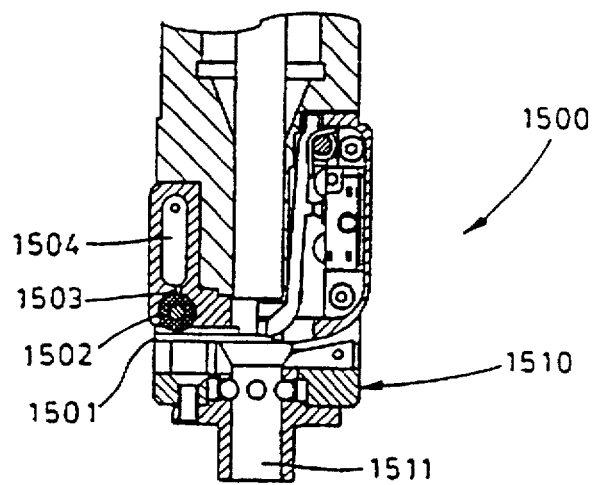
FIGS. 22 to 24 are sectional side views of fifteenth to seventeenth embodiments of the invention.

As an alternative to vacuum to releasably secure the rivets to the punch nose, contact adhesive may be applied to the heads. 12 of the rivets 10, before the rivets are engaged by the punch. In FIG. 22, a roller 1502 is provided in the delivery passage 1501 of the setting tool 1510 on fastening machine 1500. A port 1503 connects the roller 1502 to a reservoir 1504 of contact adhesive. As the rivets pass through the delivery passage 1501 to the fastener delivery passage 1511, a thin layer of contact adhesive is applied to the rivet heads 12 by the roller 1502 to enable the rivets to releasably adhere to the nose of the punch (not shown) as the latter advances the rivets to the workpiece(s).

Figure 23:
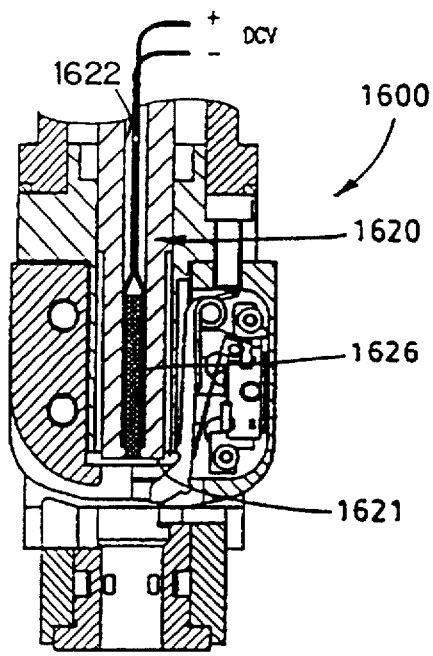

In FIG. 23, the punch 1620 of fastening machine 1600 has an electromagnet 1626 in a passage 1622 in the punch 1620. The electromagnet 1626 is connected to a battery (DCV) via a suitable switch (not shown) to selectively retain the rivet on the nose (1621 of the punch 1620.

Figure 24:
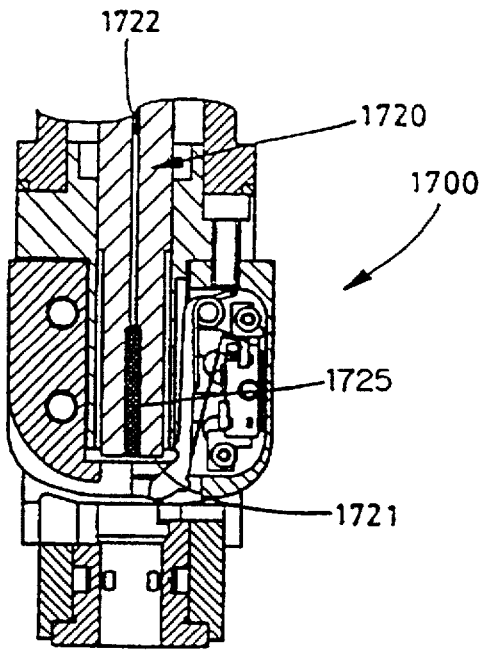

In FIG. 24, a permanent magnet 1725 is provided in the passage 1722 in the punch 1720 of fastening machine 1700. (Preferably, a thin shield is provided in the punch 1720 to protect the punch from becoming magnetised.) The magnet 1726 provides an attractive force to releasably retain the rivet 10 on the punch nose 1721.

Figure 25:
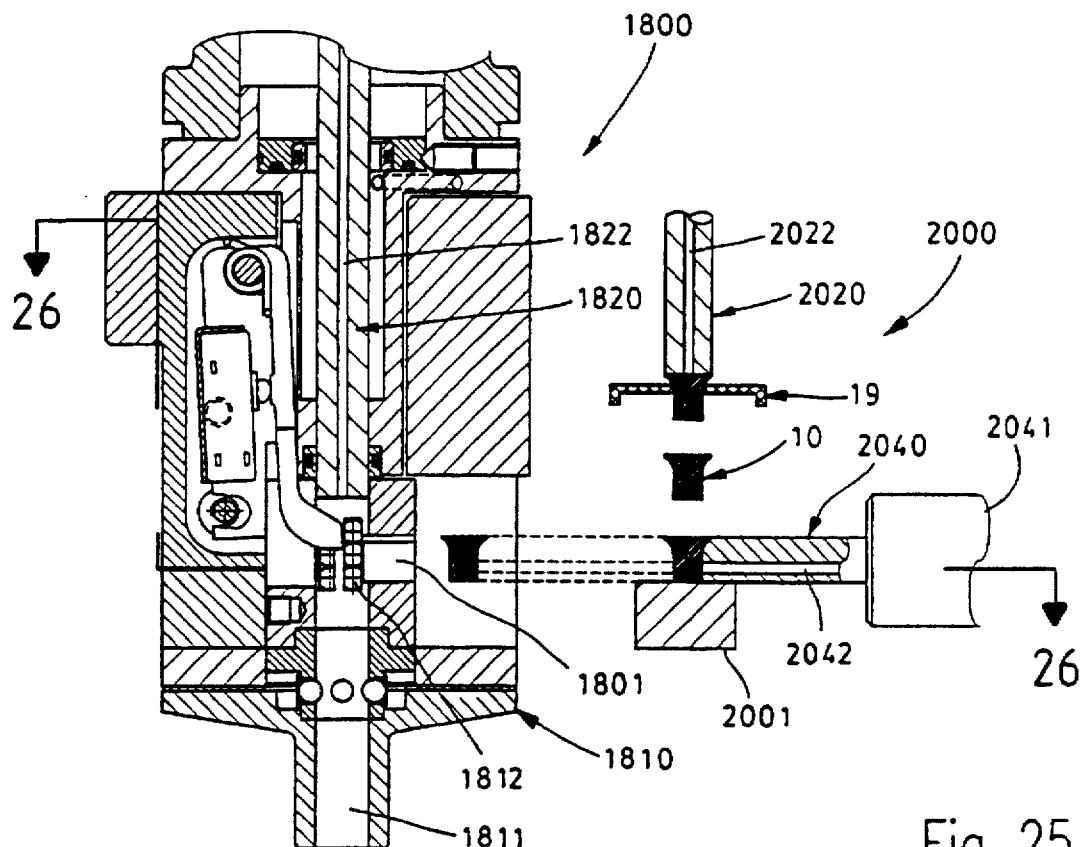
FIG. 25 is a sectional side view showing the use of the vacuum to enable the handling of rivets in a transfer station.
Figure 26:
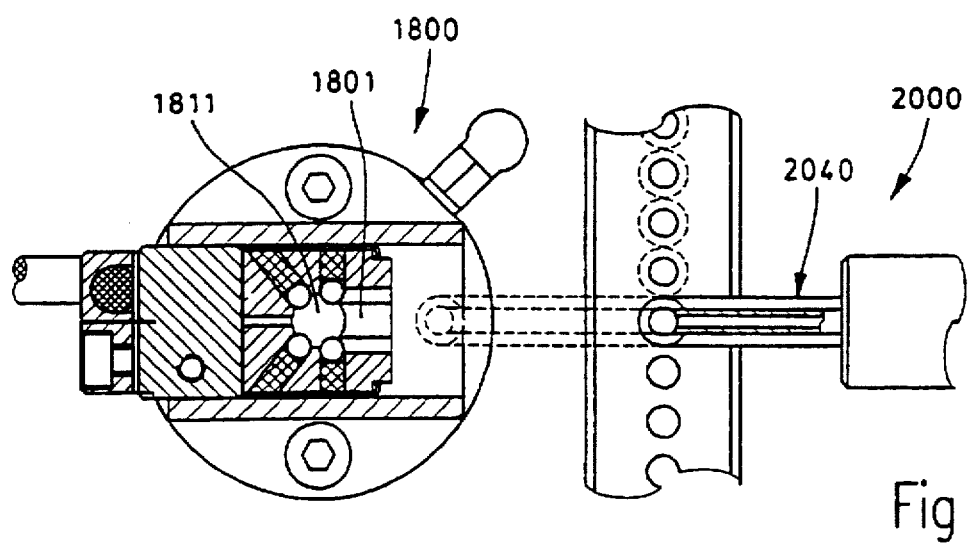
FIG. 26 is a sectional plan view taken on line 26—26 on FIG. 25.

Referring now to FIGS. 25 and 26, a fastening machine 1800, generally similar to the fastening machine 200 of FIG. 5, is supplied with rivets by a transfer station 2000.

Rivets 10, in a tape 19, are released from the tape by a release actuator 2020, which advances the rivets 10 to a stop 2001, in alignment with a transfer actuator 2040. When a rivet 10 is received at the stop 2001, timer means (not shown) cause the pneumatic cylinder 2041 to advance the transfer actuator 2040 to deliver the rivet through the supply passage 1801, to be engaged by the balls 1812 to centralize the rivet in the delivery passage 1811 in the setter tool 1810. Vacuum passages 2022 and 2042 in the actuators 2020 and 2040 are selectively connected to the vacuum source to which passage 1822 in punch 1820 is selectively connected to enable the rivets 10 to be releasably secured to the actuator 2020 and 2040 as the rivets are transferred from the tape 19 to the stop 2001, and from the stop 2001 to the supply passage 1801 in the fastening machine 1800.

In a modified embodiment, the rivets 10 may be supplied to the stop 2001 by a blow-feeding tube (equivalent to tube 208 in FIGS. 5 and 6), and the rivets 10 are then delivered to the supply passage 1801 by the transfer actuator 2040.

Various changes and modifications may be made to the embodiments described and illustrated without departing from the scope of the present invention defined in the appended claims.

We claim:

1. A fastener actuator for a fastening machine, wherein the actuator advances a fastener toward a workpiece for securing the fastener to the workpiece, comprising:
   means defining a fastener delivery passage downwardly through which the fastener passes,
   a fastener supply passage for sequentially delivering fasteners to the fastener delivery passage, and wherein the fastener actuator is vertically movable through the fastener delivery passage, the actuator including a nose at its leading end for engaging a fastener and advancing the same toward the workpiece, the actuator being provided with an internal passage one end of which is open to the nose of the actuator and another end of which is connected to a vacuum source through a control, whereby connecting the internal passage to the vacuum source effects vacuum retention of the fastener on the nose of the actuator to maintain orientation of the fastener as the actuator advances toward the workpiece.

2. The fastener actuator of claim 1, wherein the means defining a fastener delivery passage comprises a setting tool, the setting tool also being formed with the fastener supply passage, and further including a plurality of resiliently biased centralizing balls provided adjacent the upper end of the delivery passage to centralize the fastener with respect to a vertical axis of the delivery passage.

3. The fastener actuator of claim 1, wherein the source of vacuum is connected to a vacuum chamber which surrounds a portion of the actuator, the actuator being formed with a port which communicates with the internal axial passage of the actuator and is selectively connected to the vacuum chamber as the actuator is advanced depending on the position of the actuator, the advancement of the actuator establishing vacuum connection to the internal passage whereby the nose of the actuator releasably retains the fastener until the vacuum is released.

4. The fastener actuator as claimed in claim 1, wherein two workpieces are secured by each fastener, and wherein the nose piece engages one of the workpieces to preclamp the workpiece to an upsetting die before the fastener fastens the workpieces together.

5. The fastener actuator as claimed in claim 1, wherein the leading end of the actuator nose forms a peripheral flange around a head on the fastener to deform the workpieces about the fastener.

6. The fastener actuator as claimed in claim 1, wherein the fasteners are supplied to the fastener supply passage by a fastener supply tape.

7. The fastener actuator of claim 6, wherein the fasteners are fed to the supply passage through a transfer station, the transfer station having a transfer actuator aligned with the fastener supply passage, and a fastener stop, and releasable fastener retaining means are provided on the transfer actuator to releasably secure the fastener to the transfer actuator as the fastener is transferred from the fastener stop to the fastener supply passage.

8. The fastener actuator as claimed in claim 7, wherein the fastener supply tape is spaced from the fastener stop, and further including a fastener release actuator which transfers the fasteners seriatim from the tape to the fastener stop, the fastener release actuator being provided with vacuum means for releasably retaining a fastener while being transferred.

9. The fastener actuator as claimed in claim 1, wherein the fasteners are fed to the fastener supply passage by a blow feeder.

10. An fastener actuator for advancing a fastener toward a workpiece for securing the fastener to the workpiece, comprising:

a housing, a setting tool operatively connected to the housing, the setting tool being formed with a fastener supply passage for receiving fasteners seriatim from a fastener source, and a fastener delivery passage through which a fastener is directed to a workpiece, said setting tool further including a plurality of resiliently biased centralizing balls provided adjacent the upper end of the delivery passage to centralize the fastener with respect to a vertical axis of the delivery passage, and wherein the fastener actuator is mounted for vertical reciprocal movement in the housing and through the fastener delivery passage, the actuator including a nose at its leading end for engaging a fastener and advancing the same toward the workpiece, the actuator being provided with an internal axial passage one end of which is open to the nose of the actuator and another end of which is connected to a vacuum source through a control, whereby connecting the internal passage to the vacuum source effects vacuum retention of the fastener on the nose of the actuator to maintain orientation of the fastener as the actuator advances through the delivery passage toward the workpiece.

11. The fastening machine of claim 10, wherein the source of vacuum is connected to a vacuum chamber which surrounds a portion of the actuator, the actuator being formed with a port which communicates with the internal axial passage of the actuator and is selectively connected to the vacuum chamber as the actuator is advanced depending on the position of the actuator, the advancement of the actuator establishing vacuum connection to the internal passage whereby the nose of the actuator releasably retains the fastener until the vacuum is released.

12. The fastening machine as claimed in clam 10, wherein two workpieces are secured by each fastener, and wherein the nose piece engages one of the workpieces to preclamp the workpieces to an upsetting die before the fastener fastens the workpieces together.

13. The fastening machine as claimed in claim 10, wherein the leading end of the actuator nose forms a peripheral flange around a head on the fastener to deform the workpieces about the fastener.

14. The fastening machine as claimed in claim 10, wherein the fasteners are supplied to the fastener supply passage by a fastener supply tape.

15. The fastening machine of claim 14, wherein the fasteners are fed to the supply passage through a transfer station, the transfer station having a transfer actuator aligned with the fastener supply passage, and a fastener stop, and releasable fastener retaining means are provided on the transfer actuator to releasably secure the fastener to the transfer actuator as the fastener is transferred from the fastener stop to the fastener supply passage.

16. An assembly as claimed in claim 15, wherein the fastener supply tape is spaced from the fastener stop, and further including a fastener release actuator which transfers the fasteners from the tape to the fastener stop, the fastener release actuator being provided with vacuum means for releasably retaining a fastener while being transferred having releasably fastener retaining means.

17. The fastening machine as claimed in claim 10, wherein the fasteners are fed to the fastener supply passage by a blow feeder.

* * * * *

(12) EX PARTE REEXAMINATION CERTIFICATE (5176th)
United States Patent
Blacket et al.

(10) Number: US 5,779,127 C1
(45) Certificate Issued: Aug. 9, 2005

(54) FASTENING MACHINES

(75) Inventors: Stuart Edmund Blacket, Closeburn (AU); Wojciech Gostylla, Camira (AU)

(73) Assignee: Henrob Limited, Clwyd (GB)

Reexamination Request:
No. 90/006,565, Mar. 13, 2003

Reexamination Certificate for:
Patent No.: 5,779,127
Issued: Jul. 14, 1998
Appl. No.: 08/722,020
Filed: Oct. 11, 1996

(22) PCT Filed: Apr. 18, 1995
(86) PCT No.: PCT/AU95/00219
§ 371 (c)(1),
(2), (4) Date: Oct. 11, 1996
(87) PCT Pub. No.: WO95/28242
PCT Pub. Date: Oct. 26, 1995

(30) Foreign Application Priority Data
Apr. 18, 1994 (AU) .............................. PM5070

(51) Int. Cl.[7] ............... B21J 15/30; B25B 23/08
(52) U.S. Cl. ............... 227/107; 227/112; 227/113; 227/119; 227/149
(58) Field of Search ............... 227/107, 108, 227/112, 113, 119, 149

(56) References Cited

U.S. PATENT DOCUMENTS

| | | | |
|---|---|---|---|
| 3,985,389 A | * | 10/1976 | Bonfield |
| 4,609,134 A | * | 9/1986 | Davern |
| 4,615,475 A | * | 10/1986 | Fuhrmeister |
| 5,009,354 A | * | 4/1991 | D'Aquila et al. |

FOREIGN PATENT DOCUMENTS

JP        05-154597     *  6/1993

OTHER PUBLICATIONS

Aluminum Industry, vol. 11, No. 5, "Pierce & Roll Riveting—the Alternate to Spot Welding" by Edwards, pp. 24–26, Oct./Nov. 1992.*

Sheet Metal Industries, Advanced Car Bodies Trigger New Fastening Technology, pp. 14–16, Oct. 1992.*

* cited by examiner

*Primary Examiner*—Scott A. Smith

(57) ABSTRACT

A fastening machine (1) has guide block (11) with a rivet delivery passage (12). Rivets (17) are supplied from a source via tube (22) and are delivered to the rivet delivery passage (12) by a rivet supply passage (20). The head of the rivet (17) is engaged by spring-loaded balls (60) to hold the rivet (17) in alignment with the rivet delivery passage (12) and a punch (16). When a limit switch (30) detects the presence of a rivet (17) in the rivet delivery passage (12), the punch (16) is advanced and the rivet (17) is releasably supported by the balls (60) and secondary balls (60A) as it is advanced to work pieces to be secured together.

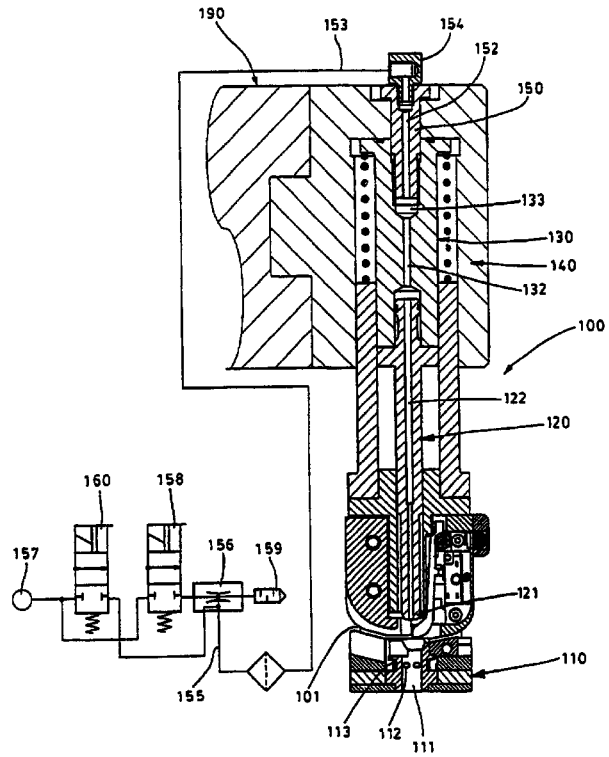

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2–9 and 11–17, dependent on an amended claim, are determined to be patentable.

1. A fastener actuator for a fastening machine, wherein the actuator advances a fastener toward a workpiece for securing the fastener to the workpiece, comprising:
   means defining a fastener delivery passage downwardly through which the fastener passes,
   a fastener supply passage for sequentially delivering fasteners to the fastener delivery passage, and wherein
   the fastener actuator is vertically movable through the fastener delivery passage, the actuator including a nose at its leading end for engaging a fastener and advancing the same toward the workpiece, the actuator being provided with an internal *axial* passage one end of which is open to the nose of the actuator and another end of which is connected to a vacuum source through a control, [whereby connecting] the internal passage *being connected* to the vacuum source [effects] *during advance of the fastener through the delivery passage by the actuator so as to effect* vacuum retention of the fastener on the nose of the actuator to maintain orientation of the fastener as the actuator advances *through the delivery passage and* toward the workpiece.

10. [An] *A* fastener actuator for advancing a fastener toward a workpiece for securing the fastener to the workpiece, comprising:
    a housing,
    a setting tool operatively connected to the housing, the setting tool being formed with a fastener supply passage for receiving fasteners seriatim from a fastener source, and a fastener delivery passage through which a fastener is directed to a workpiece, said setting tool further including a plurality of resiliently biased centralizing balls provided adjacent the upper end of the delivery passage to centralize the fastener with respect to a vertical axis of the delivery passage, and wherein
    the fastener actuator is mounted for vertical reciprocal movement in the housing and through the fastener delivery passage, the actuator including a nose at its leading end for engaging a fastener and advancing the same toward the workpiece, the actuator being provided with an internal axial passage one end of which is open to the nose of the actuator and another end of which is connected to a vacuum source through a control, [whereby connecting] the internal passage *being connected* to the vacuum source [effects] *during advance of the fastener through the delivery passage by the actuator so as to effect* vacuum retention of the fastener on the nose of the actuator to maintain orientation of the fastener as the actuator advances through the delivery passage toward the workpiece.

\* \* \* \* \*